(12) United States Patent
Han et al.

(10) Patent No.: US 11,074,187 B2
(45) Date of Patent: Jul. 27, 2021

(54) METHOD, APPARATUS AND COMPUTER PROGRAM PRODUCT FOR MANAGING ADDRESS IN STORAGE SYSTEM

(71) Applicant: EMC IP Holding Company LLC, Hopkinton, MA (US)

(72) Inventors: Geng Han, Beijing (CN); Jian Gao, Beijing (CN); Lifeng Yang, Beijing (CN); Xinlei Xu, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 73 days.

(21) Appl. No.: 16/354,732

(22) Filed: Mar. 15, 2019

(65) Prior Publication Data

US 2020/0026658 A1  Jan. 23, 2020

(30) Foreign Application Priority Data

Jul. 20, 2018 (CN) .......................... 201810801740.3

(51) Int. Cl.
| | |
|---|---|
| G06F 12/08 | (2016.01) |
| G06F 12/122 | (2016.01) |
| G06F 16/901 | (2019.01) |
| G06F 12/0882 | (2016.01) |
| G06F 12/0815 | (2016.01) |
| G06F 16/31 | (2019.01) |

(52) U.S. Cl.
CPC ...... *G06F 12/0882* (2013.01); *G06F 12/0815* (2013.01); *G06F 12/122* (2013.01); *G06F 16/322* (2019.01); *G06F 16/901* (2019.01)

(58) Field of Classification Search
None
See application file for complete search history.

(56) References Cited

U.S. PATENT DOCUMENTS

| | | | |
|---|---|---|---|
| 6,779,094 B2 | 8/2004 | Selkirk et al. | |
| 6,779,095 B2 | 8/2004 | Selkirk et al. | |
| 6,804,755 B2 | 10/2004 | Selkirk et al. | |
| 6,912,537 B2 | 6/2005 | Selkirk et al. | |
| 7,392,365 B2 | 6/2008 | Selkirk et al. | |
| 7,809,759 B1* | 10/2010 | Bruso | G06F 16/2246 707/797 |
| 10,515,071 B2* | 12/2019 | Ushijima | G06F 3/0608 |
| 2002/0078047 A1* | 6/2002 | Hollines | G06F 16/2246 |
| 2006/0167960 A1* | 7/2006 | Lomet | G06F 16/2322 |
| 2007/0143287 A1* | 6/2007 | Adl-tabatabai | G06F 12/0815 |

(Continued)

*Primary Examiner* — Kaushikkumar M Patel
(74) *Attorney, Agent, or Firm* — BainwoodHuang

(57) ABSTRACT

Techniques manage addresses in a storage system. In such techniques, an address page of an address pointing to target data in the storage system is determined in response to receiving an access request for accessing data in the storage system. A transaction for managing the address page is generated on the basis of the address page, here the transaction at least comprises an indicator of the address page and a state of the transaction. A counter describing how many times the address page is referenced is set. The transaction is executed at a control node of the storage system on the basis of the counter. With such techniques, the access speed for addresses in the storage system can be accelerated, and then the overall response speed of the storage system can be increased.

23 Claims, 18 Drawing Sheets

(56) References Cited

U.S. PATENT DOCUMENTS

| | | | |
|---|---|---|---|
| 2014/0025651 A1* | 1/2014 | Schreter | G06F 12/0261 |
| | | | 707/695 |
| 2016/0092113 A1* | 3/2016 | Veal | G06F 3/0608 |
| | | | 711/103 |
| 2016/0357791 A1* | 12/2016 | Levandoski | G06F 12/1009 |
| 2017/0091226 A1* | 3/2017 | Kharatishvili | G06F 16/316 |
| 2018/0046387 A1* | 2/2018 | Erdmann | G06F 3/0638 |
| 2018/0260231 A1* | 9/2018 | Peng | G06F 9/3887 |

* cited by examiner

METHOD, APPARATUS AND COMPUTER PROGRAM PRODUCT FOR MANAGING ADDRESS IN STORAGE SYSTEM

CROSS-REFERENCE TO RELATED APPLICATION(S)

This application claims priority to Chinese Patent Application No. CN201810801740.3, on file at the China National Intellectual Property Administration (CNIPA), having a filing date of Jul. 20, 2018, and having "METHOD, APPARATUS, AND COMPUTER PROGRAM PRODUCT FOR MANAGING ADDRESS IN STORAGE SYSTEM" as a title, the contents and teachings of which are herein incorporated by reference in their entirety.

FIELD

Various implementations of the present disclosure generally relate to address management, and more specifically, to methods, apparatuses and computer program products for managing addresses in a storage system.

BACKGROUND

With the development of data storage techniques, various data storage devices now provide users with increasingly high data storage capacity, and their data access speed has been improved greatly. With the increase of data storage capacity, users also impose higher demands on data reliability and response time of storage systems. So far a variety of new storage systems have been developed to support a larger storage space. With the expansion of storage space, the length of addresses also increases gradually. How to manage address data pointing to user data in storage systems more effectively becomes a focus of research.

SUMMARY

Therefore, it is desirable to develop and implement a technical solution for managing a storage system more effectively. It is desired that the technical solution can be compatible with existing storage systems and manage existing storage systems more effectively by reconstructing various configurations of these storage systems.

According to a first aspect of the present disclosure, there is provided a method for managing addresses in a storage system. In the method, an address page of an address pointing to target data in the storage system is determined in response to receiving an access request for accessing data in the storage system. A transaction for managing the address page is generated on the basis of the address page, here the transaction at least includes an indicator of the address page and a state of the transaction. A counter describing how many times the address page is referenced is set. The transaction is executed at a control node of the storage system on the basis of the counter.

According to a second aspect of the present disclosure, there is provided an apparatus for processing a computing task, including: at least one processor; a volatile memory; and a memory coupled to the at least one processor, the memory having instructions stored thereon, the instructions, when executed by the at least one processor, causing the apparatus to perform acts including: determining an address page of an address pointing to target data in the storage system in response to receiving an access request for accessing data in the storage system; generating, on the basis of the address page, a transaction for managing the address page, the transaction at least including an indicator of the address page and a state of the transaction; setting a counter describing how many times the address page is referenced; and executing the transaction at a control node of the storage system on the basis of the counter.

According to a third aspect of the present disclosure, there is provided a computer program product. The computer program product is tangibly stored on a computer readable medium and includes machine executable instructions which, when executed, cause the machine to implement a method according to the first aspect.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first," "second" and so on can refer to same or different objects. The following text also can include other explicit and implicit definitions.

Figure 1:
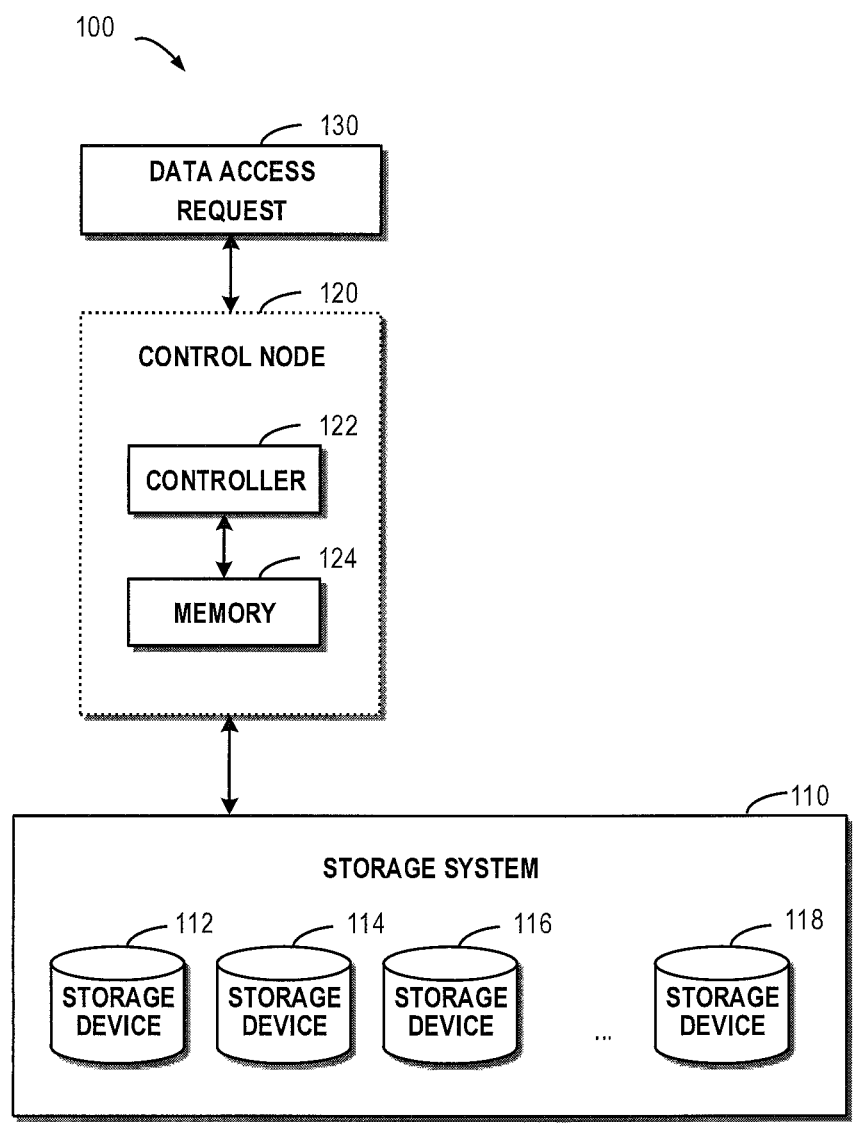
FIG. 1 illustrates a schematic view of a storage system in which a method of the present disclosure may be implemented.

FIG. 1 shows a schematic view 100 of a storage system 110 in which a method of the present disclosure may be implemented. As depicted, the storage system 110 may include multiple storage devices 112, 114, 116, . . . , 118, at which point the storage system 110 may serve, via a control node 120, a data access request 130 from a user. The control node 120 may include a controller 122 and a memory 124. When the control node 120 receives the data access request 130 from the user, target data may be loaded to the memory 124 by means of the controller 122, so as to serve the data access request 130. It will be understood although FIG. 1 illustrates only one control node 120 (local control node), a further control node (peer control node) may be included in other implementation. Here the two control nodes may concurrently serve multiple data access requests from users.

Figure 2:
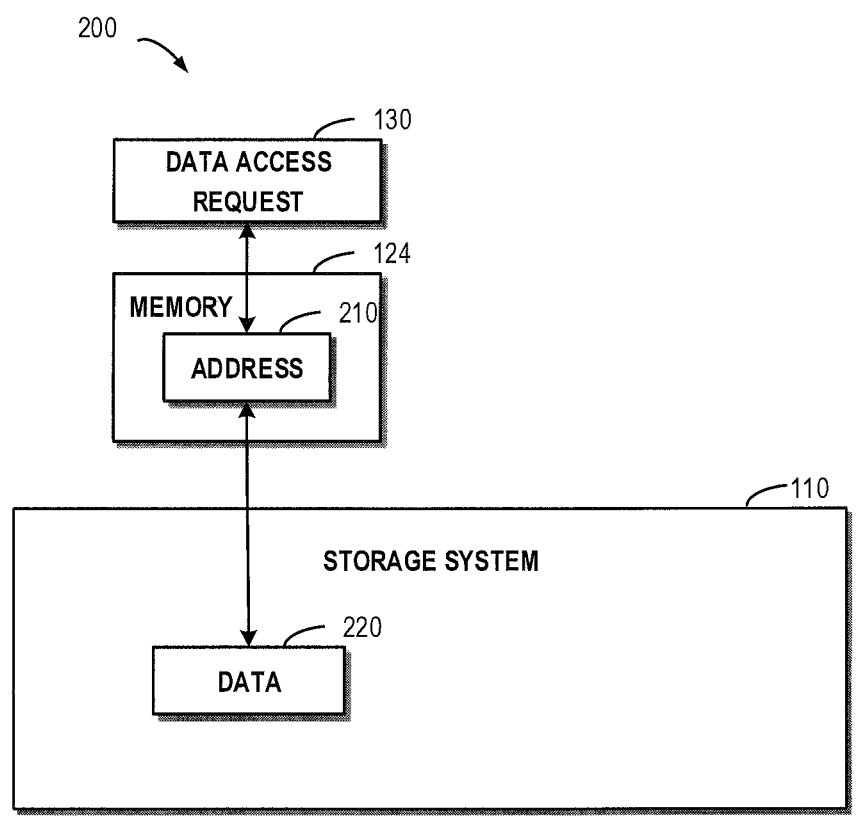
FIG. 2 illustrates a block diagram for accessing data in a storage system according to implementations of the present disclosure.

FIG. 2 schematically shows a block diagram 200 for accessing data in a storage system. As depicted, when a data access request 130 is received, first an address 210 of target data to be accessed needs to be parsed from the data access request 130, and the address 210 needs to be loaded to the memory 124. Here the address 210 may point to a location of target data 220 in the storage system 110 as defined in the data access request 130.

It will be understood how to manage addresses is a key factor that will affect the response speed of the storage system 110. Currently, it has been proposed to arrange a dedicated cache in the storage system 124 to store an address associated with the data access request 130. However, the existing technical solution leverages a traditional cache technical solution to manage the address, so the address management is low-efficiency.

To solve the above drawback, implementations of the present disclosure provide a method, apparatus and computer program product for managing addresses in a storage system. In implementations of the present disclosure, for a received data access request, a transaction is established so as to manage an address associated with data access. The performance of address management may be improved by means of the above example implementations.

Figure 3:
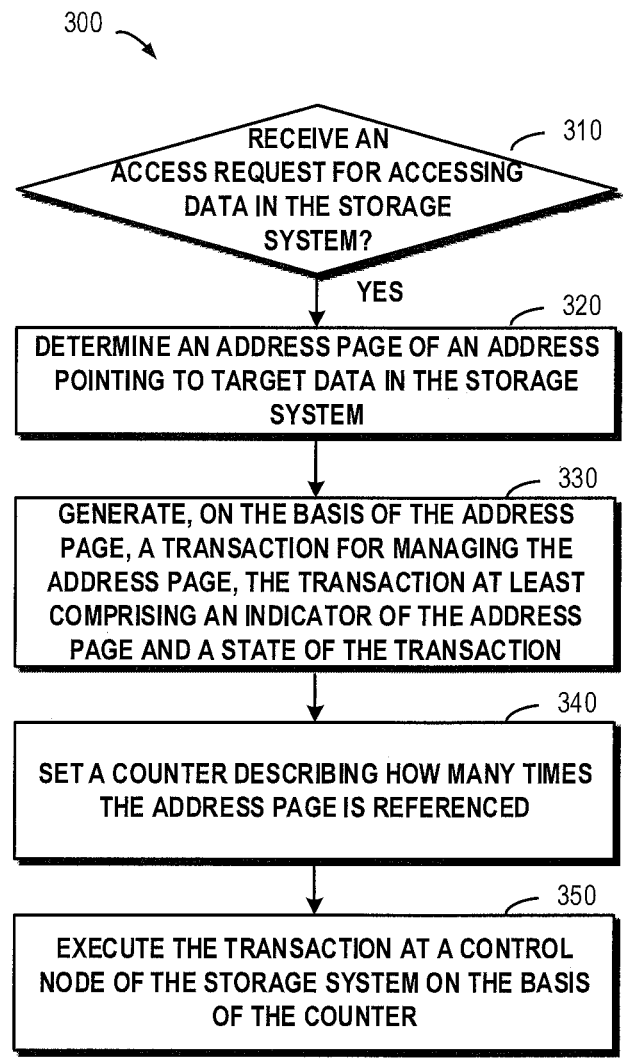
FIG. 3 illustrates a flowchart of a method for managing addresses according to implementations of the present disclosure.

In the method, in response to an access request for accessing data in the storage system, an address page of an address pointing to target data in the storage system is determined. A transaction for managing the address page is generated on the basis of the address page, the transaction at least including an indicator of the address page and a state of the transaction. A counter describing how many times the address page is referenced is set. The transaction is executed at a control node of the storage system on the basis of the counter. With reference to FIG. 3, detailed description is presented below to a detailed flow of the method according to the present disclosure.

FIG. 3 schematically shows a flowchart of a method 300 for managing addresses according to implementations of the present disclosure. At block 310, it is determined whether an access request for accessing data in the storage system 110 is received. If the decision result is "yes," then the method 300 proceeds to block 320. At block 320, an address page of an address pointing to target data in the storage system is determined. Here the address page may store the address pointing to the target data. According to example implementations of the present disclosure, the address may be stored in various ways. For example, the address may be represented using a start address of the target data in the storage system 110 and a length of the target data. For another example, when the address is stored using a tree storage structure, the address may further be represented using a path of a node on each level in the tree storage structure.

Figure 4:
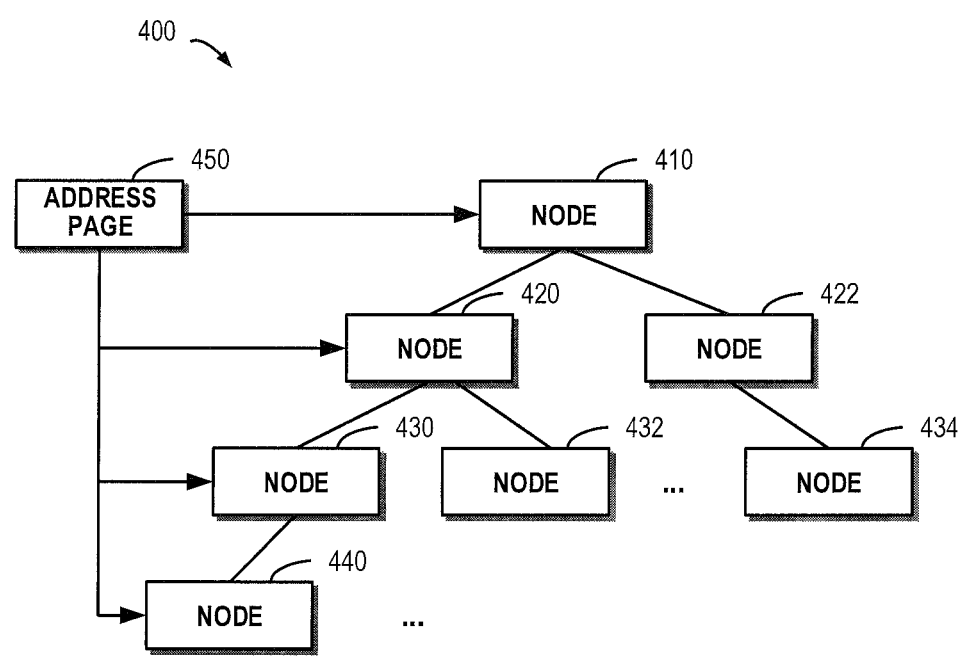
FIG. 4 illustrates a block diagram of a structure of addresses according to implementations of the present disclosure.

With reference to FIG. 4, detailed description is presented below to more details about the address page. FIG. 4 schematically shows a block diagram of a structure 400 according to implementations of the present disclosure. As depicted, addresses of data in the storage system 110 may be stored in a tree structure. The tree structure may be, for example, a binary tree or other tree structure. The tree may have multiple levels, for example, a node 410 on a first level of the tree, nodes 420 and 422 on a second level of the tree, nodes 430, 432 and 434 on a third level of the tree, and a node 440 on a fourth level. Although the tree shown in FIG. 4 has four levels, according to example implementations of the present disclosure, addresses may further be stored in other tree structure.

In this implementation, an address page 450 may include a set of addresses, each of which describes an address on each level in the tree structure. For example, the address page 450 may point to the nodes 410, 420, 430 and 440 and include data in each node. Here the address page 450 may have a variable length. For example, the address page 450 may have a length of 64 bits.

Returning to FIG. 3, at block 330, a transaction for managing the address page is generated on the basis of the address page, here the transaction at least including an indicator of the address page and a state of the transaction. It will be understood the transaction may have different states, so as to indicate the flow proceeds to which state during the execution of the transaction. Specifically, the transaction may include the following states:

(1) TX_STATE_FREE: meaning the transaction is in a free state.

(2) TX_STATE_STARTED: meaning the transaction has been started and is in a start state.

(3) TX_STATE_LOCAL_COMMITTED: meaning the transaction is currently under committing at a local control node.

(4) TX_STATE_PEER_COMMITTING: meaning the transaction is currently under committing at a peer control node.

(5) TX_STATE_PEER_COMMITTED: meaning the transaction has been committed at a peer.

Figure 5:
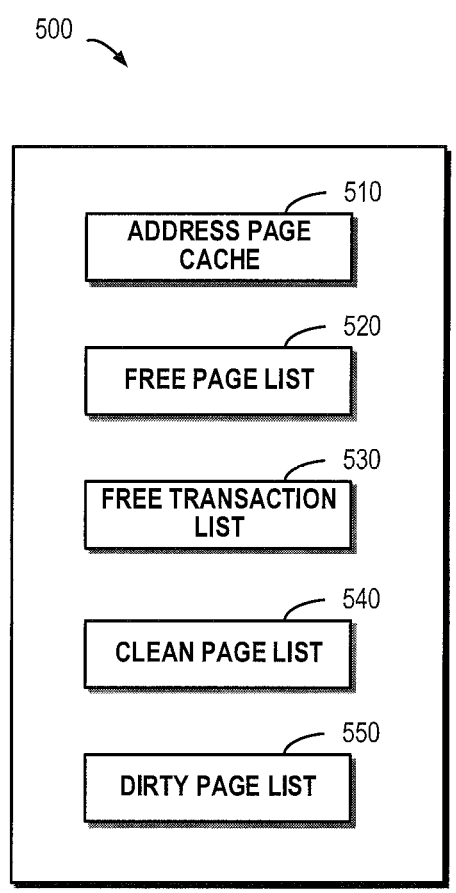
FIG. 5 illustrates a block diagram of a control structure for managing addresses according to implementations of the present disclosure.

At block 340, a counter describing how many times the address page is referenced is set. Subsequently at block 350, the transaction is executed at the control node 120 of the storage system 110 on the basis of the counter. In this implementation, multiple data structures may be set to manage the address page. FIG. 5 schematically shows a block diagram of a control structure 500 for managing addresses according to implementations of the present disclosure. As depicted, a control structure 500 may be set at a control node 124. The control structure 500 may include: an address page cache 510 for storing an address page of an address involved in a received data access request; a free address page list 520 for indicating free address pages at the control node 124 which may be allocated for use; a free transaction list 530 for indicating free transactions that are available for being allocated at the control node 124; a clean address page list 540 for indicating an address page which is used without any content being changed during the execution of the storage system 110; and a dirty address page list 550 for indicating an address page which is used with content being changed during the execution of the storage system 110. According to example implementations of the present disclosure, the clean address page list 540 and the dirty address page list 550 may be constructed on the basis of the least recently used principle.

It will be understood here the address page cache may be provided as multiple data structures. According to example implementations of the present disclosure, the address page cache may be set in a list form. At this point, various address pages may be loaded to the address page cache one by one according to the order in which these address pages are used. According to example implementations of the present disclosure, in order to increase the management efficiency for the page cache, the address page cache may further be set on the basis of a hash function. For example, the entire storage space of the address page cache may be divided into different buckets on the basis of the hash function, and each address page is placed into a corresponding bucket according to a hash value of content in the address page. It will be understood that, in order to avoid the access conflict during operation, when operating an address page in a given bucket, the bucket may be locked first, and then the bucket is unlocked after completion of the operation, so that the address page in the bucket may be used for other operation.

It will be understood in order to keep data consistency in the storage system 110, the transaction atomicity, consistency, isolation and durability (referred to as ACID in short) needs to be guaranteed. According to example implementations of the present disclosure, the storage system 110 satisfying the ACID requirement may be implemented on the basis of the control structure 500. It will be understood since two control nodes may be deployed to control data access operation on the storage system 110, data changed at one control node need to be mirrored to the other control node. At this point, an address of an address page cache for a local control node and an address of an address page cache for a peer control node may further be recorded at the control structure 500.

Figure 6:
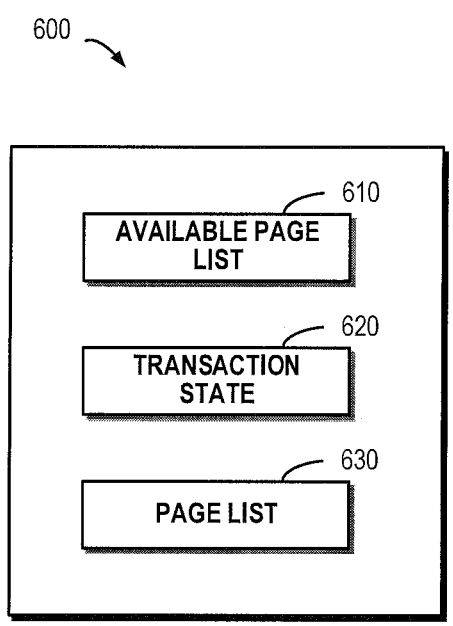
FIG. 6 illustrates a block diagram of a transaction node according to implementations of the present disclosure.

FIG. 6 schematically shows a block diagram of a transaction node 600 according to example implementations of the present disclosure. As depicted, the transaction node 600 may include an available address page list 610 for indicating an address page which has been allocated to a transaction represented by the transaction node 600. By allocating to the transaction multiple address pages indicated by the available address page list 610, it is possible to avoid deadlock which is caused by available address page shortage in the running process of the storage system. The transaction node 600 may further include a transaction state 620 and an address page list 630. Specifically, the transaction state 620 may involve the above described multiple states, and the address page list 630 may include an address page involved by a transaction represented by the transaction node 600. It will be understood when the address page takes a four-level structure described with reference to FIG. 4, the address page list 630 may include information concerning the nodes 410, 420, 430 and 440.

Figure 7:
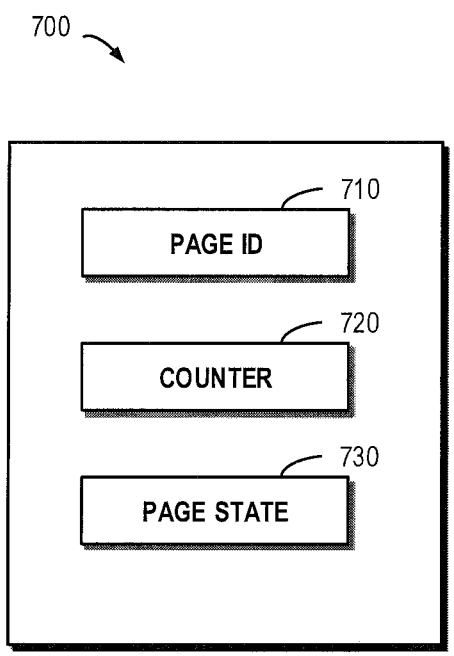
FIG. 7 illustrates a block diagram of an address page according to implementations of the present disclosure.

FIG. 7 schematically shows a block diagram of an address page node 700 according to example implementations of the present disclosure. The address page node 700 may, for example, include: an address page ID 710 for indicating a unique number of an address page; and a counter 720 for recording how many times the address page is referenced. It will be understood in the context of the present disclosure, reference means an address page is used, including access to the address page by a data access request and access executed inside the storage system for guaranteeing the data consistency. Further, the address page node 700 may further include an address page state 730, which may, for example, be selected from the following states.

(1) PD_STATE_INVALID: meaning the address page is in an invalid state. For example, a space has been allocated in the address page cache whereas the address page is not yet completely loaded to the allocated space, at which point the address page is in an invalid state. For another example, an available address page which is not allocated is also in an invalid state.

(2) PD_STATE_VALID: meaning the address page is in a valid state. For example, subsequent to the above invalid state, after the address page is completely loaded, the address page will be changed to a valid state.

(3) PD_STATE_DIRTY: meaning data on the address page are valid, where data have been modified but not yet flushed to a storage device of the storage system.

(4) PD_STATE_DIRTY_PREPARE: meaning the address page is operated by a transaction and the transaction has not yet been committed, at which point content of the address page might be modified.

(5) PD_STATE_FLUSHING: meaning data on the address page is currently being flushed to a storage device of the storage system.

Figure 8:
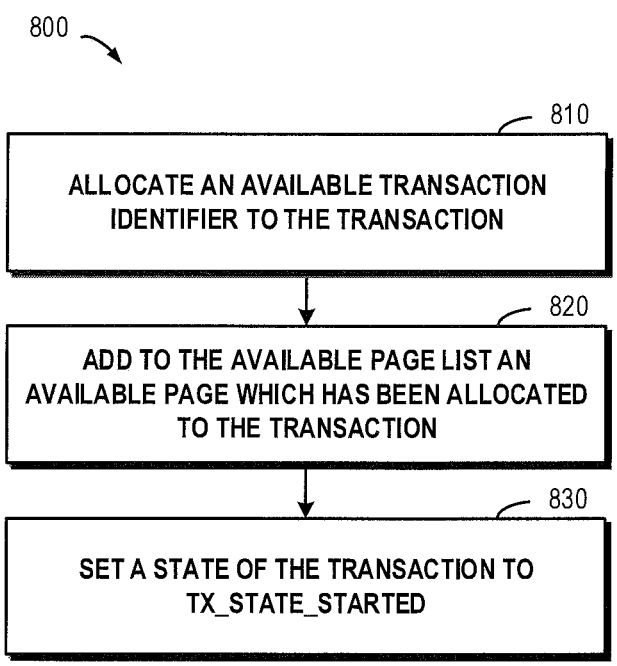
FIG. 8 illustrates a flowchart of a method for starting a transaction according to implementations of the present disclosure.

According to example implementations of the present disclosure, generating the transaction may include a start process. Specifically, FIG. 8 schematically shows a flowchart of a method 800 for starting a transaction according to implementations of the present disclosure. At block 810, first an available transaction identifier may be allocated to the transaction. Here an available identifier may be selected from the free transaction list 530 shown in FIG. 5 and then allocated. At block 820, an available address page may be allocated to the transaction, and the allocated address page may be loaded to the available address page list 610 in the transaction node 600. It will be understood here the number of address pages which will be used by the transaction may be estimated, and based on the estimated number, a corresponding number of free address pages may be selected from the free address page list 520 in the control structure 500 and then allocated. At block 830, a state of the transaction may be set to TX_STATE_STARTED, which means the transaction has been started.

According to example implementations of the present disclosure, first the type of the access request may be determined, and then the transaction may be generated on the basis of the type and the address page. With the above example implementations, which operations to be executed in a subsequent transaction may be determined specifically in accordance with difference types of access requests. According to example implementations of the present disclosure, the access request may include a read request, a write request and a read-modify-write request. Detailed description will be presented below with reference to FIGS. 9 to 11 respectively.

According to example implementations of the present disclosure, if it is determined the access request indicates a read operation will be performed to the address page, then a read transaction may be generated. In general, first it may be determined whether the address page exists in the address page cache, and in case of a miss, the address page may be added to the address page cache, and the address page may be added to the transaction. Further, a counter describing how many time the address page is referenced may be set. Here, the counter may be increased from an initial value to a predefined step size. For example, where the initial value is equal to 0, the counter for the address page may be set to 1. If the address page already exists in the address page cache, this means the address page is already loaded to the address page cache when processing a previous data access request. At this point, only a corresponding address page needs to be obtained from the address page cache and a counter for the address page is increased.

Figure 9:
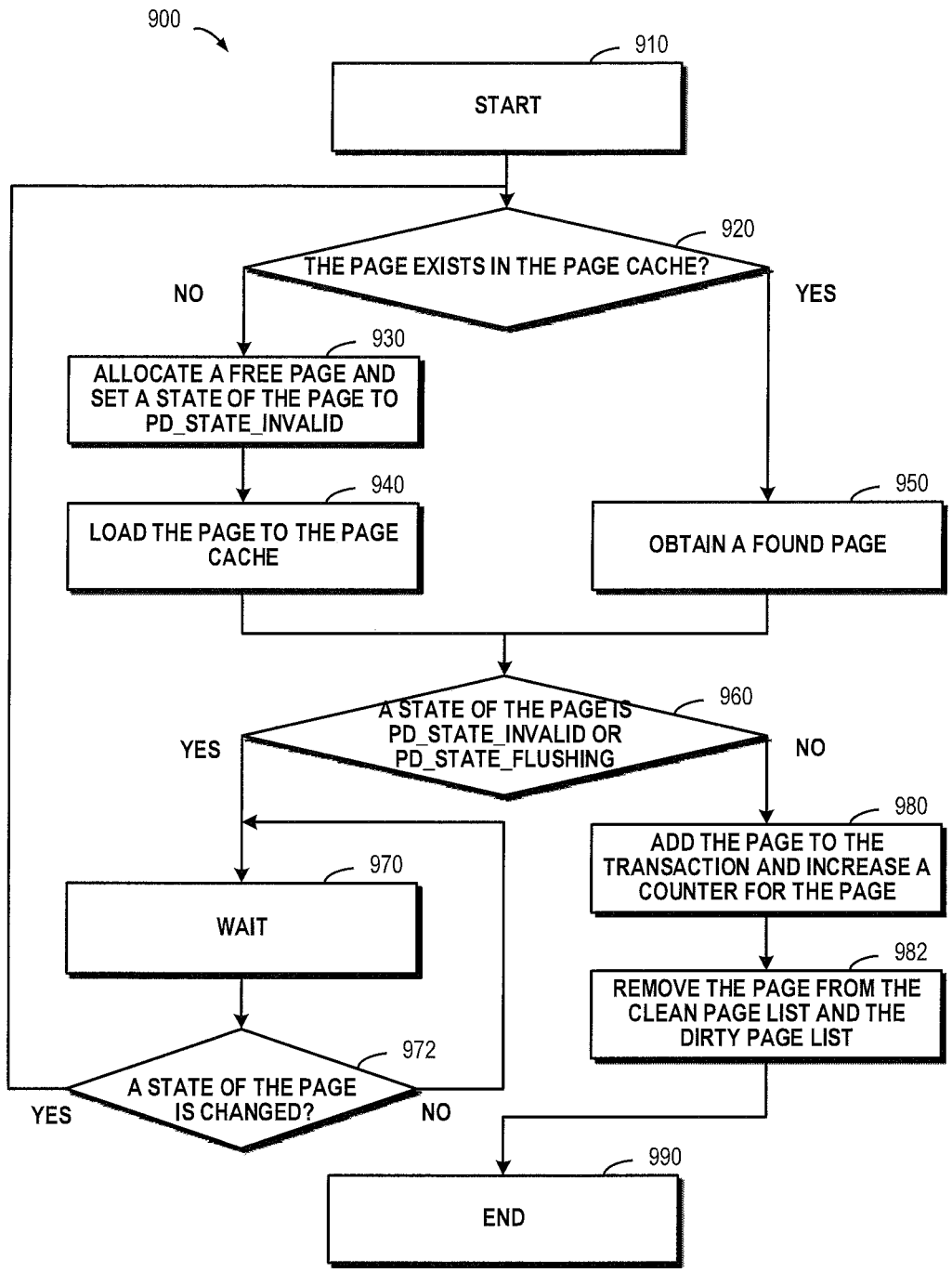
FIG. 9 illustrates a flowchart of a method for a read transaction according to implementations of the present disclosure.

With reference to FIG. 9, detailed description is presented below to how to process a read request. FIG. 9 schematically shows a flowchart of a method 900 for a read transaction according to implementations of the present disclosure. As depicted, if it is detected the received data access request 130 is a read request, then the method 900 is started at block 910. At block 920, it is judged whether an address page indicated by the data access request 130 exists in the address page cache 920. If not, then the method 900 proceeds to block 930, at which point a free address page may be allocated, and a state of the allocated address page is set to PD_STATE_INVALID. At block 940, a loading process may be executed in background so as to load data on the address page to the address page cache.

Returning to block 920, if it is determined the address page exists in the address page cache, then the method 900 proceeds to block 950 so as to fetch the found the address page from the address page cache. Next a state of the address page is judged at block 960. It will be understood since the invalid state and the flushing state are not steady states, it is necessary to wait for a result of other operation in the storage system 110 before executing a subsequent step. At block 960, if it is determined the address page state is PD_STATE_INVALID or PD_STATE_FLUSHING, then the method 900 proceeds to block 970 and wait for the address page to change. At block 972, if it is determined the address page state changes, then the method 900 returns to block 920. If the address page state does not change, then the method 900 returns to block 970 to wait further.

At block 960, if it is determined the address page state is neither of the above two unsteady states, then the method 900 proceeds to block 980. At block 980, the address page is added to the address page list 630 in the transaction node 600. At block 982, the address page may be removed from a corresponding list (clean address page list 540 and dirty address page list 550) in the control structure 500.

It will be understood although not shown in FIG. 9, first a bucket determined on the basis of a hash value of the address page may be locked after the method 900 starts, and the bucket is unlocked before the method 900 ends.

According to example implementations of the present disclosure, if it is determined the access request indicates a write operation will be performed to the address page, then operations for a write transaction may be executed. In general, the address page may be added to the address page cache, a counter for the address page may be increased, and the address page may be added to the transaction. In this way, a transaction specially used for processing write operations may be established.

Figure 10:
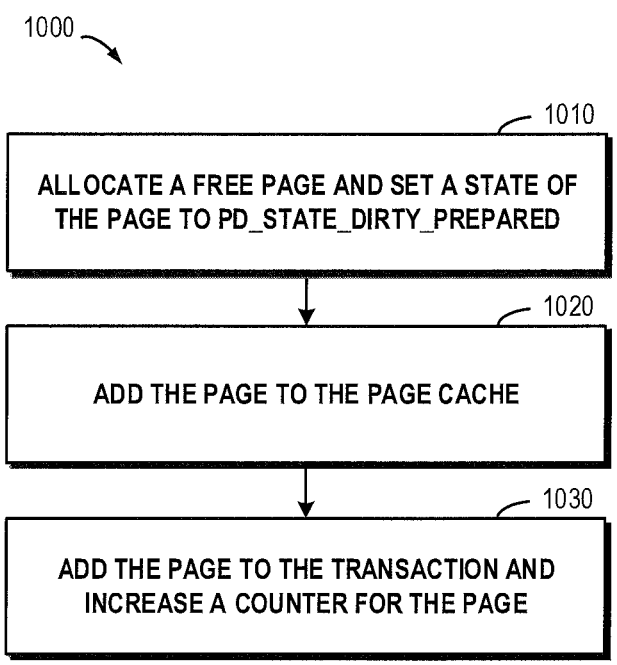
FIG. 10 illustrates a flowchart of a method for a write transaction according to implementations of the present disclosure.

With reference to FIG. 10, detailed description is presented below to more details. FIG. 10 schematically shows a flowchart of a method 1000 for a write transaction according to example implementations of the present disclosure. As depicted, at block 1010, a free address page may be allocated, and a state of the allocated address page may be set to PD_STATE_DIRTY_PREPARED. At block 1020, the address page may be added to the address page cache. At block 1030, the address page may be added to the address page list 630 in the transaction node 600, and a counter for the address page in the address page node may be increased. It will be understood since it is guaranteed among upper operations of the storage system 110 that no write operation will be performed to the same address pages, the method 1000 here will not involve any write conflict.

It will be understood although not shown in FIG. 10, first a bucket determined on the basis of a hash value of the address page may be locked after the method 1000 starts, and the bucket is unlocked before the method 1000 ends.

According to example implementations of the present disclosure, if it is determined the access request indicates a read-modify-write operation will be performed to the address page, then operations for a read-modify-write transaction may be executed. In general, a copy of the address page may be generated, a counter for the address page and a counter for the copy may be increased, and the address page together with the copy may be added to the transaction.

Figure 11:
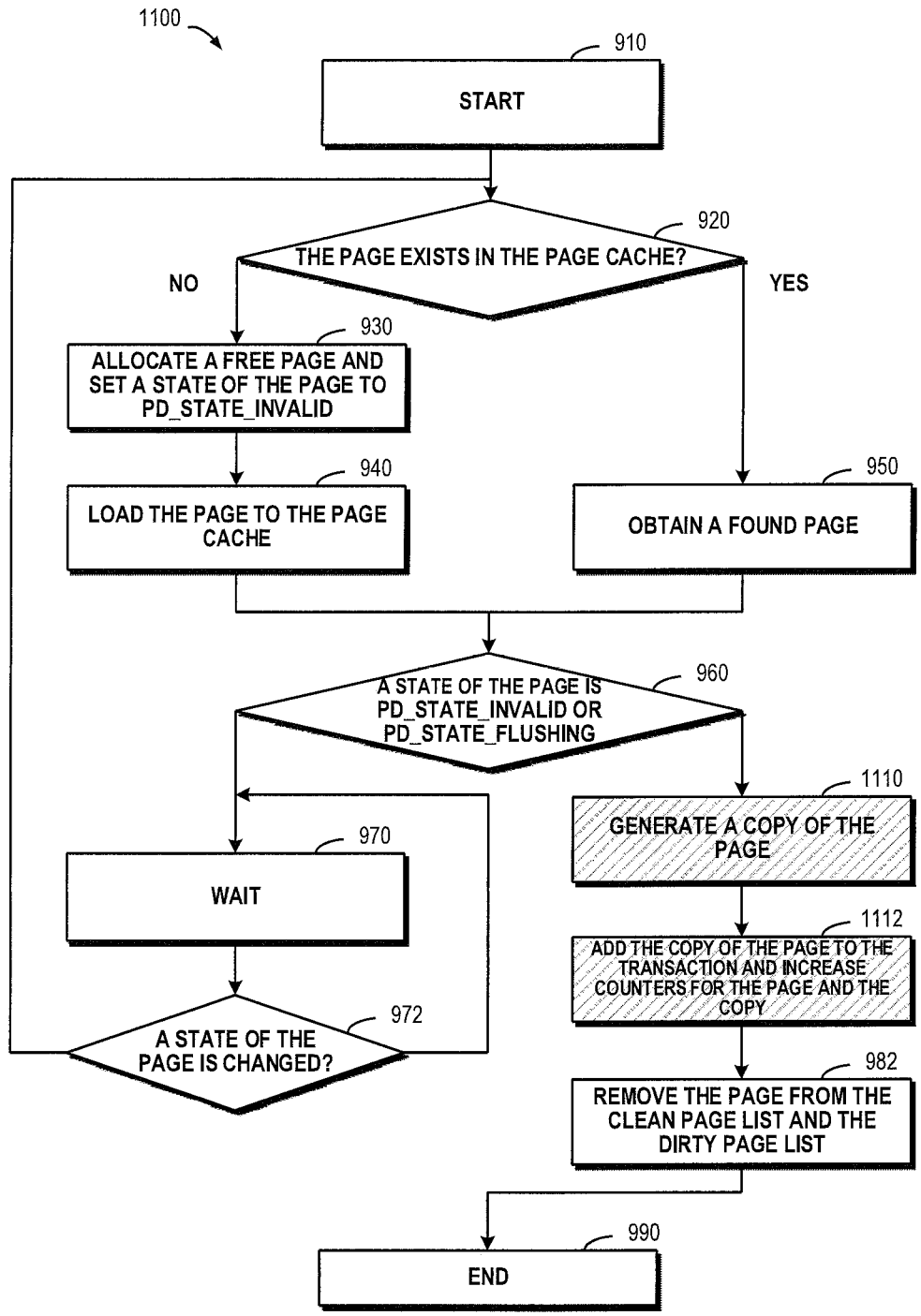
FIG. 11 illustrates a flowchart of a method for a read-modify-write transaction according to implementations of the present disclosure.

With reference to FIG. 11, detailed description is presented below to more details. FIG. 11 schematically shows a flowchart of a method 1100 for a read-modify-write transaction according to example implementations of the present disclosure. The method 1100 is generally similar to the method 900 as shown in FIG. 9, and the difference lies in shaded blocks 1110 and 1112. It will be understood the read-modify-write operation first reads content on the address page and then modifies the read content. To prevent a potential failure from arising during the modification, a copy of the address page may be generated at block 1110, and later the copy is modified while keeping the original address page content unchanged. In this way, when a failure occurs in the storage system and prevents the modification from completion, a recovery may be executed on the basis of the original address page. Subsequently at block 1112, both the original address page and the copy may be added to the address page list 630 in the transaction node 600, and counters for both of them may be increased.

It will be understood although not shown in FIG. 11, first a bucket determined on the basis of a hash value of the address page may be locked after the method 1100 starts, and the bucket is unlocked before the method 1100 ends.

Description has been presented above to how to generate a corresponding transaction on the basis of the type of the data access request 130. With reference to FIGS. 12 to 15, description is presented below to how to execute at the control node a transaction generated by the above method.

Figure 12:
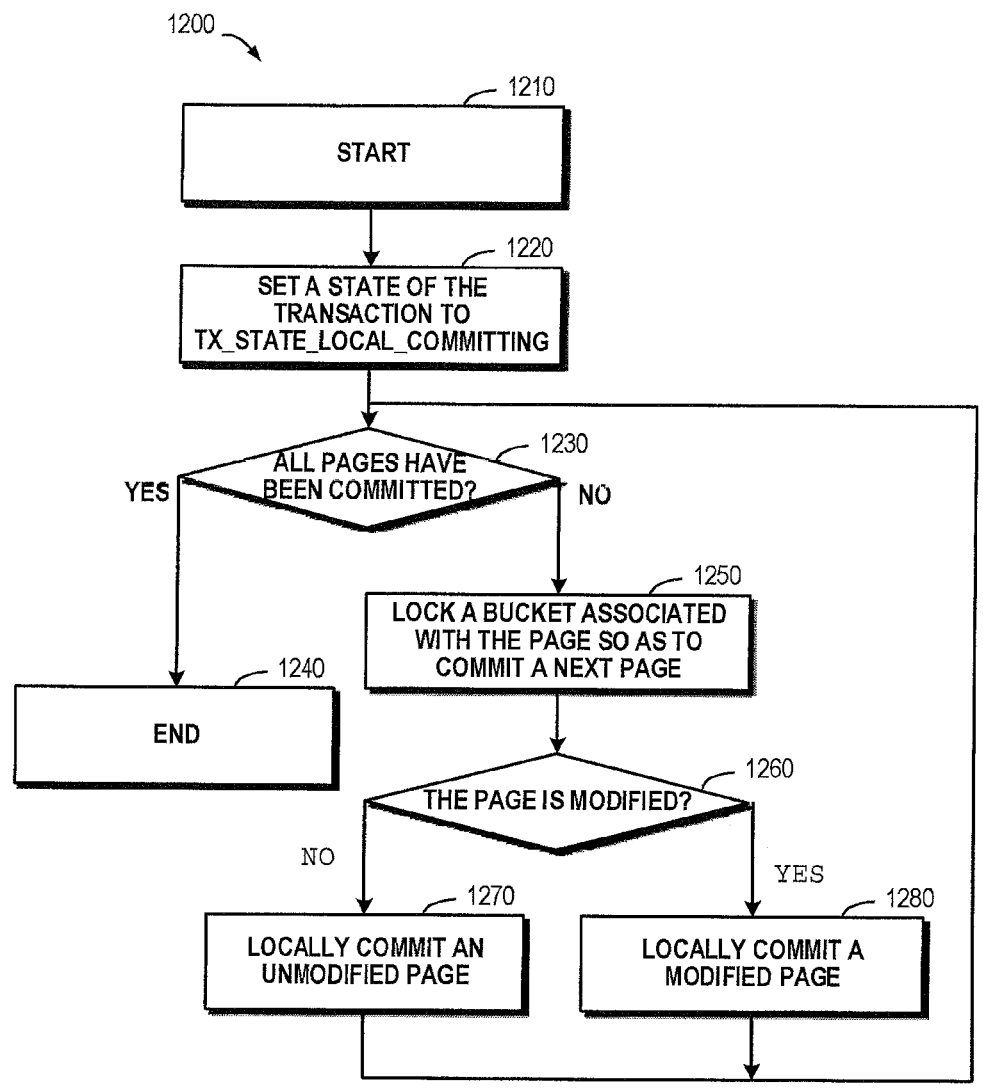
FIG. 12 illustrates a flowchart of a method for executing a transaction locally at a control node according to implementations of the present disclosure.

According to example implementations of the present disclosure, the transaction may be executed at the control node 130 of the storage system 110. Specifically, the following operations may be executed for various address pages in the address page list in the transaction node. For a given address page in the transaction, first a state (the state indicating whether the given address page is modified) of the given address page may be determined. Subsequently, a counter for the given address page and the address page cache may be updated on the basis of the determined state. With reference to FIG. 12, detailed description is presented below to how to execute the transaction at the control node 130. It will be understood when there is only one local control node for controlling access to the storage system 110, a method 1200 to be described with reference to FIG. 12 may only be executed at the control node. When a peer control node exists, different operations need to be executed at the local control node and the peer control node respectively.

FIG. 12 schematically shows a flowchart of a method 1200 for executing a transaction locally at a control node according to example implementations of the present disclosure. With the above example implementations, operations may be performed to all address pages involved by the transaction one by one. Further, the efficiency of address management may be improved by executing a corresponding operation depending on whether the address page is modified. As shown in FIG. 12, the method 1200 starts at block 1210. Subsequent at block 1220, a state of the transaction may be set to TX_STATE_LOCAL_COMMITTING indicating the transaction is in a local committing state. It will be understood in the method 1200 operations need to be performed to all address pages involved by the transaction one by one. Thus, at block 1230 it may be judged whether all address pages have been processed. If the judgement result is "yes," the method 1200 proceeds to 1240 where the method 1200 ends. If the judgement result is "no," then the method 1200 proceeds to block 1250.

At block 1250, an address page to be committed next may be determined, and a bucket involved by the address page may be locked. In this way, data inconsistency during operation of the storage system 110 may be avoided. If the address page is not modified at 1260, then the method 1200 proceeds to block 1270 so as to process the unmodified address page. If the address page is modified at 1260, then the method proceeds to block 1280 so as to process the modified address page.

According to example implementations of the present disclosure, for an unmodified address page, first the type of the address page may be determined. Here the type refers to whether the address page is a copy which is created during a read-modify-write. If the judgement result is "yes," then the address page type is copy type; otherwise, the address page type is common type. For an address page of common type, a counter for the address page may be updated. If the address page type is copy type, then the original address page may be decoupled from the copy, and the given address page may be released from the address page cache. With the above example implementations, different processing is performed for different types of address pages, so that addresses may be managed in a more effective way.

Figure 13:
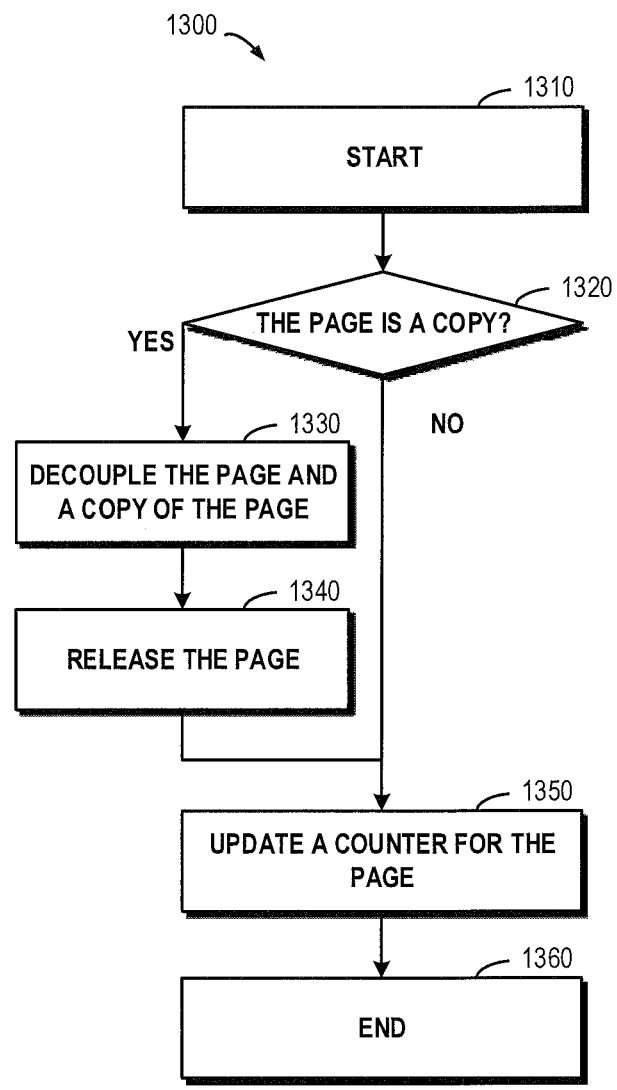
FIG. 13 illustrates a flowchart of a method for locally committing an unmodified address page according to implementations of the present disclosure.

With reference to FIG. 13, detailed description is presented below to how to locally commit an unmodified address page. FIG. 13 schematically shows a flowchart of a method 1300 for locally committing an unmodified address page according to example implementations of the present disclosure. The method 1300 starts at block 1310. At block 1320, the type of an address page which is being currently processed may be determined. If the determined type is copy type, then the method 1300 proceeds to block 1330. At block 1330, the address page and an original address page may be decoupled, the address page being a copy of the original address page. Here "decouple" means breaking an association therebetween. At this point, since the copy is not modified, content of the copy does not need to be maintained, but a storage space occupied by the copy may be released. At block 1340, the address page as the copy may be released, and the method 1300 proceeds to block 1350.

Returning to block 1320, if the address page is determined as common type, then the method 1300 may directly skip blocks 1330 and 1340 but proceed to block 1350. At block 1350, the counter for the address page may be updated, and then the method 1300 ends at block 1360. It will be understood the operation of updating the counter at block 1350 does not mean simply decreasing a value of the counter. Detailed operations will be described with reference to FIG. 14.

Figure 14:
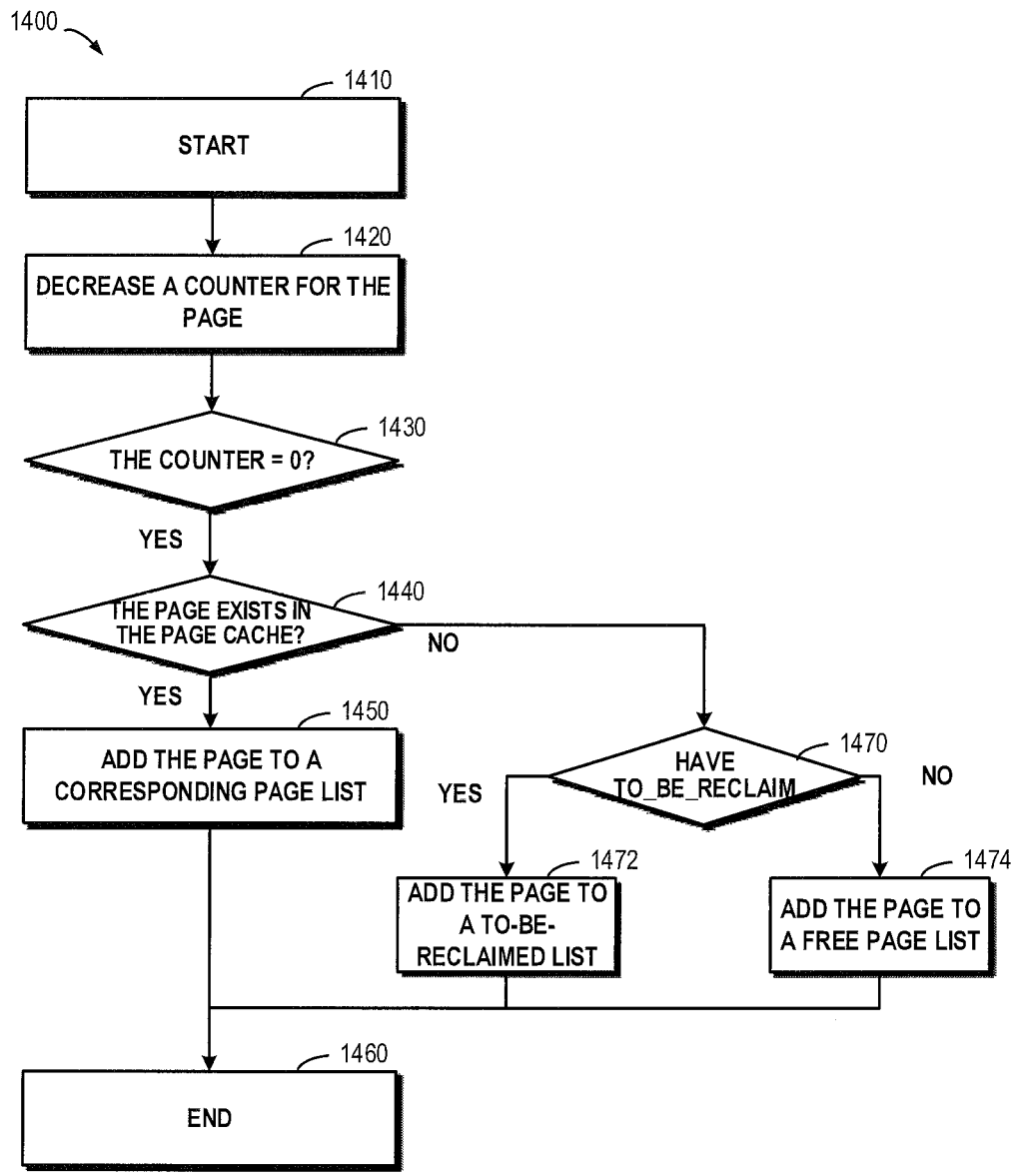
FIG. 14 illustrates a flowchart of a method for updating a counter for an address page according to implementations of the present disclosure.

FIG. 14 schematically shows a flowchart of a method 1400 for updating a counter for an address page according to implementations of the present disclosure. It will be understood the update here does not simply decrease a value of the counter, but a corresponding operation will be executed on the basis of a concrete state of the address page. With the above example implementations, customized operations may be performed to the address page, and further ACID features of the transaction may be guaranteed.

As shown in FIG. 14, the method 1400 starts at block 1410. At block 1420, a given counter for a given address page may be decreased. Here "decrease" means decreasing a value of the counter by a predefined step size. Suppose a current value is 2, then a decreased value of the counter may be set to 1. Next at block 1430, it is judged whether the counter is equal to 0. If yes, then the method 1400 proceeds to block 1440. At block 1440, it may be judged whether the address page exists in the address page cache. If yes, then the method 1400 proceeds to block 1450, or else the method 1400 proceeds to block 1470.

At block 1450, the address page may be added to a corresponding address page list. Here the address page list may be any of the clean address page list 540 and the dirty address page list 550 in the above control structure 500.

Specifically, if content of the address page is not modified, then the address page may be added to the clean address page list 540; if content of the address page is modified, then the address page may be added to the dirty address page list 550.

Operations at blocks 1470, 1472 and 1477 involve a circumstance where a peer control node exists. To guarantee consistency between data accessed by the local control node and the peer control node, a flag TO_BE_RECLAIM needs to be set to the address page. It will be understood if the flag is set, this means the peer control node has not yet completed operations for the address page, at which point the local control node needs to perform special processing to the address page instead of releasing the address page immediately. Specifically, if the flag is set to the address page, then the method 1400 proceeds to block 1472 so as to add the address page to a to-be-reclaimed list. At block 1470, if it is determined the flag TO_BE_RECLAIM is not set, then the method 1400 proceeds to block 1474 where the address page may be added to the free address page list.

Figure 15:
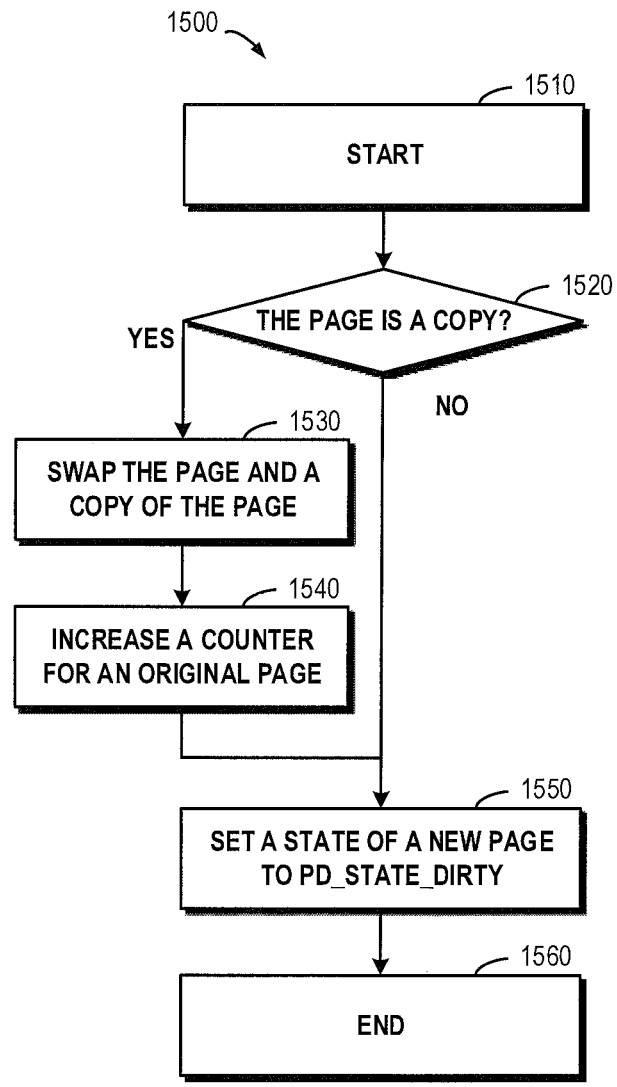
FIG. 15 illustrates a flowchart of a method for locally committing a modified address page according to implementations of the present disclosure.

Description has been presented above as to how to locally commit an unmodified address page. With reference to FIG. 15, detailed description is presented below to how to locally commit a modified address page. FIG. 15 schematically shows a flowchart of a method 1500 for locally committing a modified address page according to example implementations of the present disclosure. As depicted, the method 1500 starts at block 1510. At block 1520, it is judged whether the type of a given address page is copy type. If the judgment result is yes, then the method 1500 proceeds to block 1530. At this point, the given address page and an original address page may be swapped, the given address page being a copy of the original address page. It will be understood here "swap" means content of the original address page is removed out of the address page cache (location of the copy) and content of the copy is moved to a location in the address page cache where the original address page used to reside. Then at block 1540, a counter for the original address page may be increased, and the method 1500 proceeds to block 1550.

Returning to block 1520, if the address page is of common type, then the method 1500 skips blocks 1530 and 1540 and directly proceeds to block 1550. At block 1550, a state of the address page (i.e. new address page in the copy) in the address page cache after the swapping may be set to PD_STATE_DIRTY.

According to example implementations of the present disclosure, a subsequent flushing operation may be executed depending on whether the state of the address page is "dirty." For example, a set of address pages whose states are "dirty" may be selected from the address page cache. Then, the selected set of address pages may be flushed to the storage system.

Figure 16:
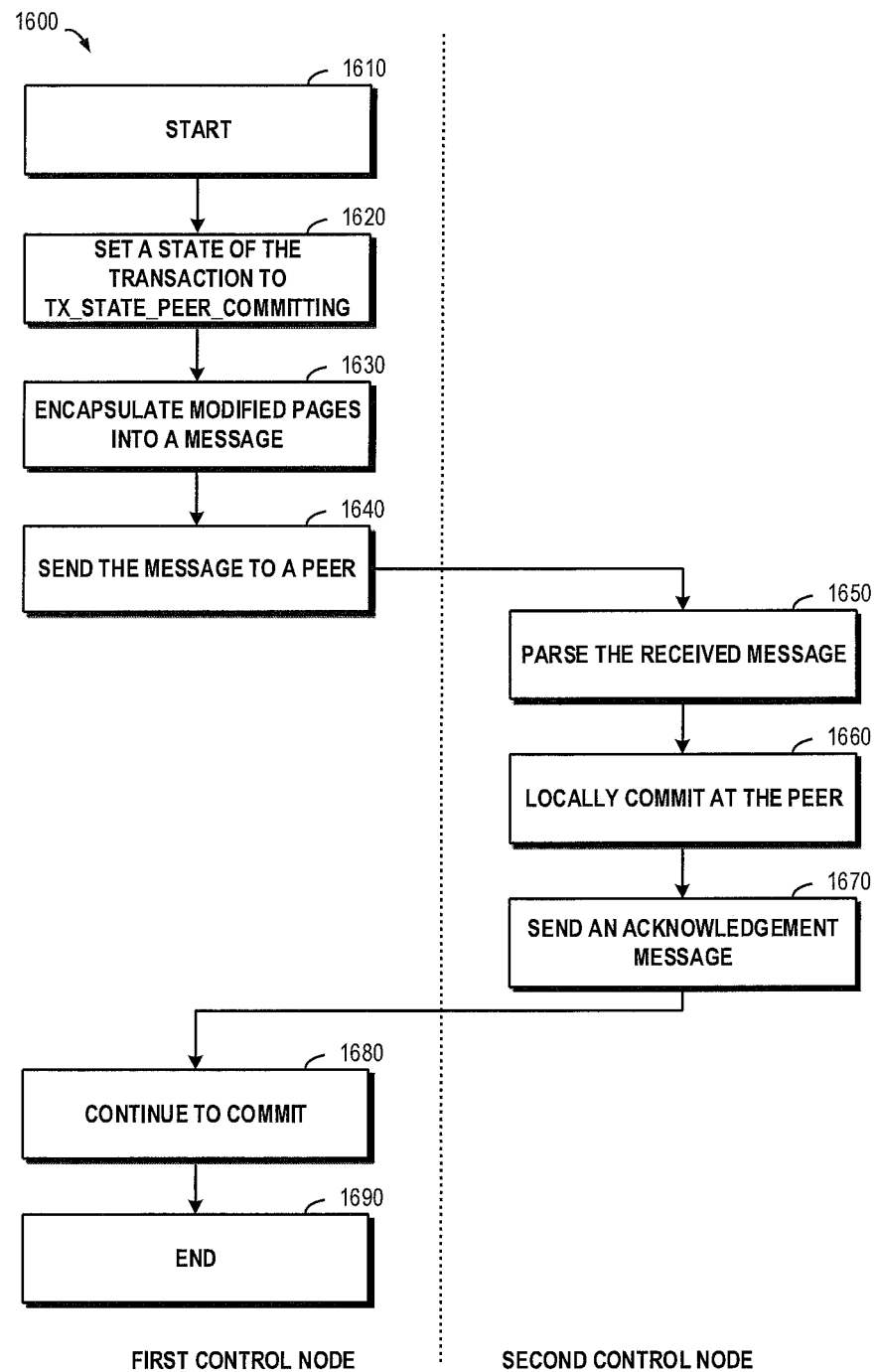
FIG. 16 illustrates a flowchart of a method for committing a transaction at a first control node and a second control node according to implementations of the present disclosure.

It will be understood that concrete operations of committing a transaction as executed at a local control node have been described in detail with reference to the figure. When a peer control node exists, the peer control node needs to be notified, from a local control node, of changes that have shown at the local control node. With reference to FIG. 16, description is presented below to operations associated with the peer control node. FIG. 16 schematically shows a flowchart of a method 1600 for committing a transaction at a first (local) control node and a second (peer) control node according to implementations of the present disclosure. In FIG. 16, the left side shows operations executed at the first control node, and the right side shows operations executed at the second control node. The method 1600 starts at block 1610, and then at block 1620, a state of the transaction is set to TX_STATE_PEER_COMMITTING. At block 1630, all modified address pages at the first control node are encapsulated into a message. According to example implementations of the present disclosure, a protocol dedicated to message transmission between two control nodes may be used for encapsulation. Subsequently, at block 1640 the message may be sent to the peer control node so as to notify the peer control node which address pages have been modified at the local control node.

Blocks 1650 to 1670 show operations executed at the second control node. At block 1650, the received message may be parsed so as to obtain address pages modified at the first control node. Then at block 1660, a commit operation may be executed at the second control node on the basis of the modified address pages as obtained. Here the commit operation is the method 1200 described with reference to FIG. 12. At block 1670, an acknowledgement message is sent to the first control node so as to indicate a local commit has been executed at the second control node. After the first control node receives the acknowledgement message from the second control node, a commit operation may further be executed at block 1680. Specifically, corresponding operations may be performed to modified address pages in the transaction.

Figure 17:
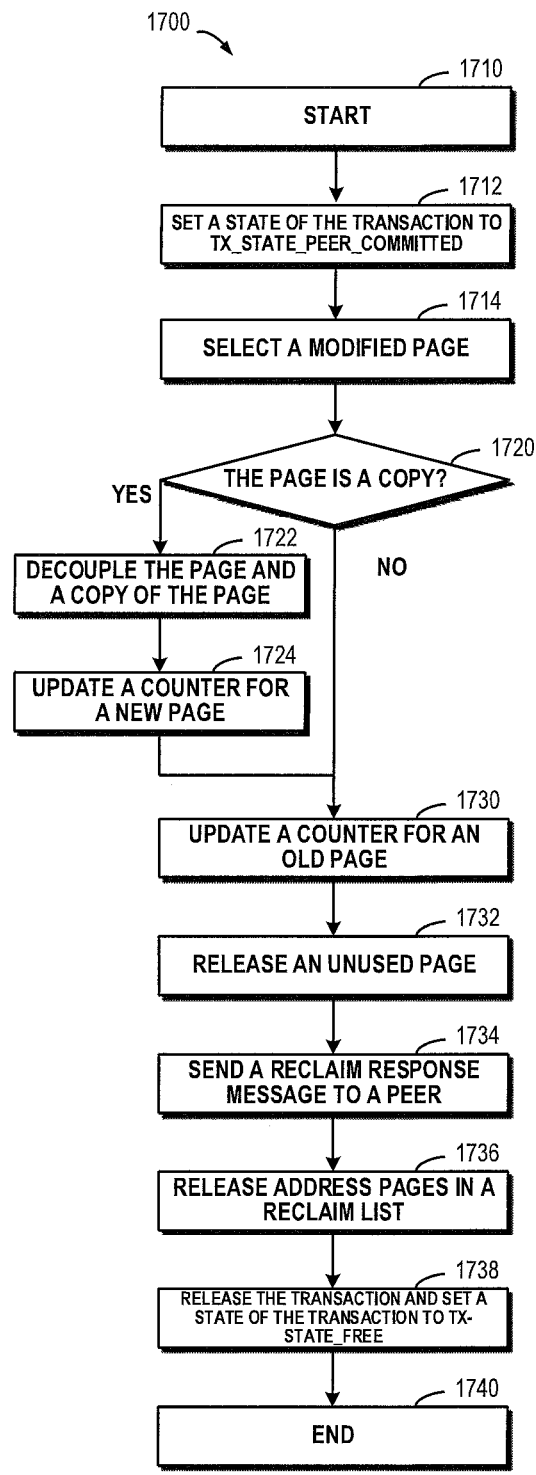
FIG. 17 illustrates a flowchart of a method for continuing to locally commit a transaction according to implementations of the present disclosure.

With reference to FIG. 17, description is presented below to more details about a local further commit. FIG. 17 schematically shows a flowchart of a method 1700 for continuing to locally commit a transaction according to implementations of the present disclosure. In this figure, the method 1700 starts at block 1710. Subsequently, at block 1712 a state of the transaction may be updated to TX_STATE_PEER_COMMITTED. At block 1714, a modified address page may be selected from an address page list of the transaction, and operations shown at blocks 1720 to 1736 may be executed to the selected address page.

At block 1720, it is determined whether the selected address page is of copy type. If the judgement result is "yes," then the method 1700 proceeds to 1722. At block 1722, the selected address page may be decoupled from a copy of the address page. At block 1724, a counter for a new address page (i.e. copy) may be updated. At block 1720, if the selected address page is of common type, then the method 1700 may skip blocks 1722 and 1724 but directly proceed to block 1730.

At block 1730, a counter for an old address page (i.e. original address page) may be updated. At block 1732, an address page which has been allocated to the transaction but not yet used may be released. At block 1734, a reclaim response message may be sent to the peer, so as to inquire the peer whether the peer will not use address pages in the reclaim list any longer. At block 1736, if an acknowledgement message is received from the peer, then address pages stored to the reclaim list may be released. At block 1738, the transaction may be released, and a state of the transaction may be set to TX_STATE_FREE. At this point, all processing operations for the transaction end at block 1740.

As examples of the method according to the present disclosure have been described in detail with reference to FIGS. 1 to 17, description is presented below to the implementation of a corresponding apparatus. According to example implementations of the present disclosure, provided is an apparatus for managing addresses in a storage system. The apparatus includes: a determining module configured to determine an address page of an address pointing to target data in the storage system in response to receiving an access request for accessing data in the storage system; a generating module configured to generate, on the basis of the address page, a transaction for managing the address page, the transaction at least including an indicator of the address page and a state of the transaction; a setting module configured to set a counter describing how many times the address page is referenced; and an executing module configured to execute the transaction at a control node of the storage system on the basis of the counter.

According to example implementations of the present disclosure, there is provided an apparatus for processing a computing task, including: at least one processor; a volatile memory; and a memory coupled to the at least one processor, the memory having instructions stored thereon, the instructions, when executed by the at least one processor, causing the apparatus to perform acts including: determining an address page of an address pointing to target data in the storage system in response to receiving an access request for accessing data in the storage system; generating, on the basis of the address page, a transaction for managing the address page, the transaction at least including an indicator of the address page and a state of the transaction; setting a counter describing how many times the address page is referenced; and executing the transaction at a control node of the storage system on the basis of the counter.

According to example implementations of the present disclosure, generating, on the basis of the address page, a transaction for managing the address page includes: determining the type of the access request; and generating the transaction on the basis of the type and the address page.

According to example implementations of the present disclosure, generating the transaction on the basis of the type and the address page includes: in response to the access request indicating a read operation is to be performed to the address page, adding the address page to an address page cache in response to determining the address page does not exist in the address page cache at the control node; and adding the address page to the transaction; wherein setting a counter describing how many times the address page is referenced includes: increasing the counter for the address page.

According to example implementations of the present disclosure, generating the transaction on the basis of the type and the address page includes: in response to the access request indicating a write operation is to be performed to the address page, adding the address page to an address page cache at the control node; increasing a counter for the address page; and adding the address page to the transaction.

According to example implementations of the present disclosure, generating the transaction on the basis of the type and the address page includes: in response to the access request indicating a read-modify-write operation is to be performed to the address page, adding the address page to an address page cache in response to determining the address page does not exist in the address page cache at the control node; generating a copy of the address page; increasing a counter for the address page and a counter for the copy; and adding the address page and the copy to the transaction.

According to example implementations of the present disclosure, executing the transaction at a control node of the storage system includes: for a given address page in the transaction, determining a state indicating whether the given address page is modified; updating the counter for the given address page and the address page cache on the basis of the state.

According to example implementations of the present disclosure, updating the counter for the given address page and the address page cache on the basis of the state includes: in response to the state indicating the given address page is not modified, in response to the type of the given address page being copy type, decoupling the given address page and an original address page, the given address page being a copy of the original address page; releasing the given address page from the address page cache; and updating the counter for the given address page; in response to the type of the given address page being common type, updating the counter for the given address page.

According to example implementations of the present disclosure, updating the counter for the given address page and the address page cache on the basis of the state includes: in response to the state indicating the given address page is modified, in response to the type of the given address page being copy type, swapping the given address page and an original address page, the given address page being a copy of the original address page; increasing a counter for the original address page; and setting a state of an address page in the address page cache after the swapping to "dirty;" in response to the type of the given address page being common type, setting a state of the given address page to "dirty."

According to example implementations of the present disclosure, there is further included: selecting a set of address pages whose states are "dirty" from the address page cache; and flushing the selected set of address pages to the storage system.

According to example implementations of the present disclosure, updating a counter identifier for the given address page includes: decreasing a given counter for the given address page; determining whether given address page is in the address page cache, in response to the given counter reaching an initial value of the counter; updating a clean address page list and a dirty address page list at the control node on the basis of the given address page in response to the given address page being in the address page cache, the clean address page list being used for indicating an unmodified address page in the address page cache, and the dirty address page list being used for indicating a modified address page in the address page cache.

According to example implementations of the present disclosure, the storage system is coupled to a further control node, and there is further included: transmitting to the further control node a modified address page to the address page cache; for a modified address page in the transaction, updating the address page cache and a counter for the modified address page on the basis of the type of the modified address page in response to an acknowledgement signal from the further control node.

According to example implementations of the present disclosure, updating the address page cache and a counter for the modified address page on the basis of the type of the modified address page includes: in response to the type of the modified address page being copy type, releasing the modified address page; and updating the counter for the modified address page.

According to example implementations of the present disclosure, updating the address page cache and a counter for the modified address page on the basis of the type of the modified address page includes: in response to the type of the modified address page being copy type, decoupling the modified address and an original address page, the modified address page being a copy of the original address page; updating a counter for the copy; in response to the type of the modified address page being common type, updating a counter for the original address page; sending a reclaim response message to a further controller; releasing an address page in a reclaim list in response to receiving from the further controller an acknowledgement to the reclaim response message.

According to example implementations of the present disclosure, addresses of data in the storage system are stored in a tree structure, the address page including a set of addresses, each of which describes an address on each level in the tree structure.

Figure 18:
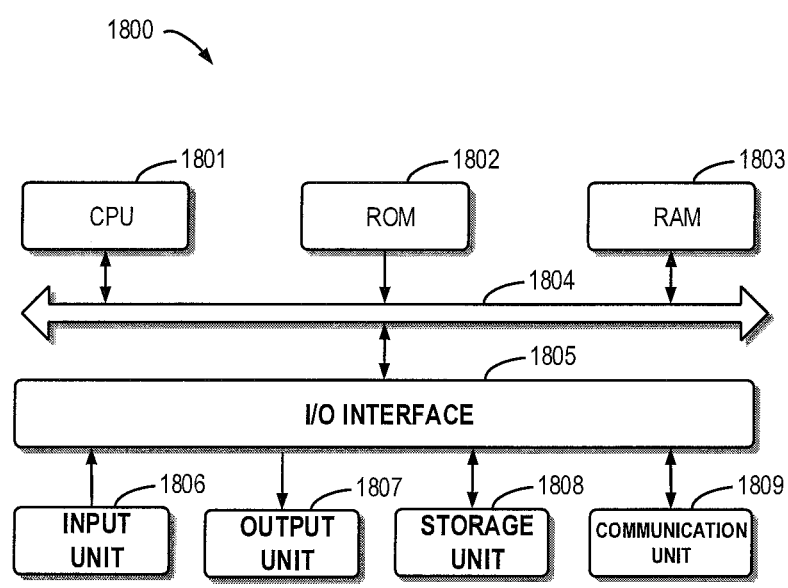
FIG. 18 illustrates a block diagram of an apparatus for managing addresses according to implementations of the present disclosure.

FIG. 18 schematically shows a block diagram of an apparatus 1800 for managing addresses in a storage system according to example implementations of the present disclosure. As depicted, the apparatus 1800 includes a central process unit (CPU) 1801, which can execute various suitable actions and processing based on the computer program instructions stored in the read-only memory (ROM) 1802 or computer program instructions loaded in the random-access memory (RAM) 1803 from a storage unit 1808. The RAM 1803 can also store all kinds of programs and data required by the operations of the apparatus 1800. CPU 1801, ROM 1802 and RAM 1803 are connected to each other via a bus 1804. The input/output (I/O) interface 1805 is also connected to the bus 1804.

A plurality of components in the apparatus 1800 is connected to the I/O interface 1805, including: an input unit 1806, such as keyboard, mouse and the like; an output unit 1807, e.g., various kinds of display and loudspeakers etc.; a storage unit 1808, such as magnetic disk and optical disk etc.; and a communication unit 1809, such as network card, modem, wireless transceiver and the like. The communication unit 1809 allows the apparatus 1800 to exchange information/data with other devices via the computer network, such as Internet, and/or various telecommunication networks.

The above described each procedure and processing, such as the method 500, can also be executed by the processing unit 1801. For example, in some implementations, the method 500 can be implemented as a computer software program tangibly included in the machine-readable medium, e.g., the storage unit 1808. In some implementations, the computer program can be partially or fully loaded and/or mounted to the apparatus 1800 via ROM 1802 and/or the communication unit 1809. When the computer program is loaded to the RAM 1803 and executed by the CPU 1801, one or more steps of the above described method 500 can be implemented. Alternatively, in other implementations, the CPU 901 also can be configured in other suitable manners to realize the above procedure/method.

According to example implementations of the present disclosure, there is provided an apparatus for managing addresses in a storage system, including: at least one processor; a volatile memory; and a memory coupled to the at least one processor, the memory having instructions stored thereon, the instructions, when executed by the at least one processor, causing the apparatus to perform acts.

According to example implementations of the present disclosure, there is provided a computer program product. The computer program product is tangibly stored on a computer readable medium and includes machine executable instructions which, when executed, cause the machine to implement the method according to the present disclosure.

According to example implementations of the present disclosure, there is provided a computer readable medium. The computer readable medium is stored with machine executable instructions thereon, the machine executable instructions, when executed by at least one processor, causing the at least one processor to implement the method according to the present disclosure.

The present disclosure can be method, apparatus, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing addresses in a storage system, the method comprising:
   determining an address page of an address pointing to target data in the storage system in response to receiving an access request for accessing data in the storage system, wherein addresses of data in the storage system are stored in a tree structure, and wherein the address page comprises a set of addresses, each of which describes an address in the tree structure;
   generating, on the basis of the address page, a transaction for managing the address page, the transaction at least comprising an indicator of the address page and a state of the transaction;
   setting a counter for the address page describing how many times the address page is referenced; and
   executing the transaction at a control node of the storage system;
   wherein generating, on the basis of the address page, the transaction for managing the address page comprises:
      determining a type of the access request; and
      generating the transaction on the basis of the type and the address page at least in part by:
         in response to the access request indicating a read-modify-write operation is to be performed to the address page:
            adding the address page to an address page cache in response to determining the address page does not exist in the address page cache at the control node;
            generating a copy of the address page;
            increasing the counter for the address page and a counter for the copy; and
            adding the address page and the copy to the transaction.

2. The method of claim 1, wherein generating the transaction on the basis of the type and the address page comprises: in response to the access request indicating a read operation is to be performed to the address page,
   adding the address page to an address page cache in response to determining the address page does not exist in the address page cache at the control node; and
   adding the address page to the transaction;
   wherein setting the counter for the address page describing how many times the address page is referenced comprises: increasing the counter for the address page.

3. The method of claim 1, wherein generating the transaction on the basis of the type and the address page comprises: in response to the access request indicating a write operation is to be performed to the address page,
   adding the address page to an address page cache at the control node;
   increasing the counter for the address page; and
   adding the address page to the transaction.

4. The method of claim 1, wherein executing the transaction at a control node of the storage system comprises: for a given address page in the transaction,
   determining a state indicating whether the given address page is modified; and
   updating a counter for the given address page, and the address page cache, on the basis of the state.

5. The method of claim 4, wherein updating the counter for the given address page and the address page cache on the basis of the state comprises: in response to the state indicating the given address page is not modified,
  in response to the type of the given address page being copy type,
    decoupling the given address page and an original address page, the given address page being a copy of the original address page;
    releasing the given address page from the address page cache; and
    updating the counter for the given address page; and
  in response to the type of the given address page being common type, updating the counter for the given address page.

6. The method of claim 4, wherein updating the counter for the given address page and the address page cache on the basis of the state comprises: in response to the state indicating the given address page is modified,
  in response to the type of the given address page being copy type,
    swapping the given address page and an original address page, the given address page being a copy of the original address page;
    increasing a counter for the original address page; and
    setting a state of an address page in the address page cache after the swapping to "dirty;" in response to the type of the given address page being common type, setting a state of the given address page to "dirty."

7. The method of claim 6, further comprising:
  selecting a set of address pages whose states are "dirty" from the address page cache; and
  flushing the selected set of address pages to the storage system.

8. The method of claim 5, wherein updating a counter for the given address page comprises:
  decreasing a given counter for the given address page;
  determining whether given address page is in the address page cache, in response to the given counter reaching an initial value of the counter; and
  updating a clean address page list and a dirty address page list at the control node on the basis of the given address page in response to the given address page being in the address page cache, the clean address page list being used for indicating an unmodified address page in the address page cache, and the dirty address page list being used for indicating a modified address page in the address page cache.

9. The method of claim 1, wherein the storage system is coupled to a further control node, further comprising:
  transmitting to the further control node a modified address page to the address page cache; and
  for a modified address page in the transaction, updating the address page cache and a counter for the modified address page on the basis of the type of the modified address page in response to an acknowledgement signal from the further control node.

10. The method of claim 9, wherein updating the address page cache and a counter for the modified address page on the basis of the type of the modified address page comprises:
  in response to the type of the modified address page being copy type,
    releasing the modified address page; and
    updating the counter for the modified address page.

11. The method of claim 9, wherein updating the address page cache and a counter for the modified address page on the basis of the type of the modified address page comprises:
  in response to the type of the modified address page being copy type, decoupling the modified address and an original address page, the modified address page being a copy of the original address page;
  updating a counter for the copy;
    updating a counter for the original address page in response to the type of the modified address page being common type;
  sending a reclaim response message to a further controller; and
  releasing an address page in a reclaim list in response to receiving from the further controller an acknowledgement to the reclaim response message.

12. An apparatus for managing addresses in a storage system, comprising:
  at least one processor;
  a volatile memory; and
  a memory coupled to the at least one processor and having instructions stored thereon, the instructions, when executed by the at least one processor, causing the apparatus to perform acts comprising:
    determining an address page of an address pointing to target data in the storage system in response to receiving an access request for accessing data in the storage system, wherein addresses of data in the storage system are stored in a tree structure, and wherein the address page comprises a set of addresses, each of which describes an address in the tree structure;
    generating, on the basis of the address page, a transaction for managing the address page, the transaction at least comprising an indicator of the address page and a state of the transaction;
    setting a counter for the address page describing how many times the address page is referenced; and
    executing the transaction at a control node of the storage system;
  wherein generating, on the basis of the address page, the transaction for managing the address page comprises:
    determining a type of the access request; and
    generating the transaction on the basis of the type and the address page at least in part by:
      in response to the access request indicating a read-modify-write operation is to be performed to the address page:
        adding the address page to an address page cache in response to determining the address page does not exist in the address page cache at the control node;
        generating a copy of the address page;
        increasing the counter for the address page and a counter for the copy; and
        adding the address page and the copy to the transaction.

13. The apparatus of claim 12, wherein generating the transaction on the basis of the type and the address page comprises: in response to the access request indicating a read operation is to be performed to the address page,
  adding the address page to an address page cache in response to determining the address page does not exist in the address page cache at the control node; and
  adding the address page to the transaction;
  wherein setting the counter for the address space describing how many times the address page is referenced comprises: increasing the counter for the address page.

14. The apparatus of claim 12, wherein generating the transaction on the basis of the type and the address page comprises: in response to the access request indicating a write operation is to be performed to the address page, adding the address page to an address page cache at the control node;
increasing a counter for the address page; and
adding the address page to the transaction.

15. The apparatus of claim 12, wherein executing the transaction at a control node of the storage system comprises: for a given address page in the transaction,
determining a state indicating whether the given address page is modified;
updating a counter for the given address page, and the address page cache, on the basis of the state.

16. The apparatus of claim 15, wherein updating the counter for the given address page and the address page cache on the basis of the state comprises: in response to the state indicating the given address page is not modified,
in response to the type of the given address page being copy type,
decoupling the given address page and an original address page, the given address page being a copy of the original address page;
releasing the given address page from the address page cache; and
updating the counter for the given address page;
in response to the type of the given address page being common type, updating the counter for the given address page.

17. The apparatus of claim 16, wherein updating the counter for the given address page and the address page cache on the basis of the state comprises: in response to the state indicating the given address page is modified,
in response to the type of the given address page being copy type,
swapping the given address page and an original address page, the given address page being a copy of the original address page;
increasing a counter for the original address page; and
setting a state of an address page in the address page cache after the swapping to "dirty;"
in response to the type of the given address page being common type, setting a state of the given address page to "dirty."

18. The apparatus of claim 17, the acts further comprising:
selecting a set of address pages whose states are "dirty" from the address page cache; and
flushing the selected set of address pages to the storage system.

19. The apparatus of claim 16, wherein updating a counter for the given address page comprises:
decreasing a given counter for the given address page;
determining whether given address page is in the address page cache, in response to the given counter reaching an initial value of the counter; and
updating a clean address page list and a dirty address page list at the control node on the basis of the given address page in response to the given address page being in the address page cache, the clean address page list being used for indicating an unmodified address page in the address page cache, and the dirty address page list being used for indicating a modified address page in the address page cache.

20. The apparatus of claim 12, wherein the storage system is coupled to a further control node, further comprising:
transmitting to the further control node a modified address page to the address page cache; and
for a modified address page in the transaction, updating the address page cache and a counter for the modified address page on the basis of the type of the modified address page in response to an acknowledgement signal from the further control node.

21. The apparatus of claim 20, wherein updating the address page cache and a counter for the modified address page on the basis of the type of the modified address page comprises:
in response to the type of the modified address page being copy type,
releasing the modified address page; and
updating the counter for the modified address page.

22. The apparatus of claim 19, wherein updating the address page cache and a counter for the modified address page on the basis of the type of the modified address page comprises:
in response to the type of the modified address page being copy type, decoupling the modified address and an original address page, the modified address page being a copy of the original address page;
updating a counter for the copy;
updating a counter for the original address page in response to the type of the modified address page being common type;
sending a reclaim response message to a further controller; and
releasing an address page in a reclaim list in response to receiving from the further controller an acknowledgement to the reclaim response message.

23. A computer program product having a non-transitory computer readable medium which stores a set of instructions to manage addresses in a storage system; the set of instructions, when carried out by computerized circuitry, causing the computerized circuitry to perform a method of:
determining an address page of an address pointing to target data in the storage system in response to receiving an access request for accessing data in the storage system, wherein addresses of data in the storage system are stored in a tree structure, and wherein the address page comprises a set of addresses, each of which describes an address in the tree structure;
generating, on the basis of the address page, a transaction for managing the address page, the transaction at least comprising an indicator of the address page and a state of the transaction;
setting a counter for the address page describing how many times the address page is referenced; and
executing the transaction at a control node of the storage system;
wherein generating, on the basis of the address page, the transaction for managing the address page comprises:
determining a type of the access request; and
generating the transaction on the basis of the type and the address page at least in part by:
in response to the access request indicating a read-modify-write operation is to be performed to the address page:
adding the address page to an address page cache in response to determining the address page does not exist in the address page cache at the control node;
generating a copy of the address page;
increasing the counter for the address page and a counter for the copy; and
adding the address page and the copy to the transaction.

* * * * *